(12) United States Patent
Strosser (10) Patent No.: US 8,051,632 B2
(45) Date of Patent: Nov. 8, 2011

(54) AUTOMATIC CALIBRATION FOR A HEADER FLOTATION SYSTEM

(75) Inventor: Richard P. Strosser, Akron, PA (US)

(73) Assignee: CNH America LLC, New Holland, PA (US)

(*) Notice: Subject to any disclaimer, the term of this patent is extended or adjusted under 35 U.S.C. 154(b) by 557 days.

(21) Appl. No.: 12/268,886

(22) Filed: Nov. 11, 2008

(65) Prior Publication Data

US 2009/0069988 A1 Mar. 12, 2009

Related U.S. Application Data

(63) Continuation-in-part of application No. 11/238,617, filed on Sep. 29, 2005, now Pat. No. 7,552,577.

(51) Int. Cl.
*A01D 41/127* (2006.01)

(52) U.S. Cl. ........................ 56/10.2 R; 701/50

(58) Field of Classification Search ............... 56/10.2 A, 56/10.2 D, 10.2 E, 10.2 R; 172/1, 2, 3, 4; 701/50; 73/1.01
See application file for complete search history.

(56) References Cited

U.S. PATENT DOCUMENTS

| | | | |
|---|---|---|---|
| 5,359,836 A | 11/1994 | Zeuner et al. | 56/10.2 |
| 5,463,854 A | 11/1995 | Chmielewski, Jr. et al. | 56/10.2 E |
| 5,524,424 A | 6/1996 | Halgrimson et al. | 56/10.2 D |
| 5,535,577 A | 7/1996 | Chmielewski et al. | 56/10.2 E |
| 5,613,352 A * | 3/1997 | Panoushek et al. | 56/10.2 E |
| 5,704,200 A | 1/1998 | Chmielewski, Jr. et al. | 56/10.2 E |
| 7,168,226 B2 | 1/2007 | McLean et al. | 56/10.2 E |
| 2007/0068129 A1 | 3/2007 | Strosser | 56/10.2 E |
| 2007/0204582 A1 | 9/2007 | Coers et al. | 56/10.2 E |
| 2007/0214760 A1 | 9/2007 | Bomleny et al. | 56/10.2 E |

* cited by examiner

*Primary Examiner* — Thomas Will
*Assistant Examiner* — Jamie L McGowan
(74) *Attorney, Agent, or Firm* — Patrick M. Sheldrake; Michael G. Harms (57) ABSTRACT

A system and method for calibrating a header flotation system of an agricultural vehicle that can be employed while the vehicle is in motion, including when traversing a field, which does not rely on, or require calibration of, height and/or pressure sensors.

14 Claims, 8 Drawing Sheets

AUTOMATIC CALIBRATION FOR A HEADER FLOTATION SYSTEM

This application is a Continuation-In-Part of U.S. patent application Ser. No. 11/238,617 filed Sep. 29, 2005 now U.S. Pat. No. 7,552,577.

TECHNICAL FIELD

The present invention relates generally to agricultural harvesting vehicles, such as windrowers, that include flotation systems for permitting their headers to ride lightly up and over rises and other elevated features during field operation, and particularly to a system and method for calibrating a header flotation system that can be employed while such vehicle is in motion, including when traversing a field, which does not rely on, or require calibration of height and/or pressure sensors.

BACKGROUND ART

Transversely or sidewardly extending, elongate headers of from about 12 feet to 30 feet and greater in length are commonly utilized on agricultural vehicles for cutting and windrowing crops such as cereal grains and other seed crops, as well as grasses. The headers be supported on height control apparatus, e.g. cylinders, or the like, or rest on skid shoes which move along the surface of a field or pasture, to position cutting apparatus of the header, such as an elongate sickle cutter bar or a row of disk cutters, close to the surface for cutting the stalks or stems of crops and grasses close to the surface. A flotation system allows the header to be guided over obstacles and uneven ground without damaging the cutting apparatus of the header.

Header flotation systems typically use a fluid circuit including an accumulator, hydraulic cylinders, and control valves to perform the flotation function. The vehicles may have a single hydraulic cylinder, or one on each side of the header, to perform both a lift and flotation function, or they may have separate hydraulic cylinders for the lift and flotation functions with the capability of independently adjusting the flotation force for each side of the header. Typically the operator selects the desired flotation setting by actuating rocker switches; wherein one switch position reduces header contact force with the ground, and another position increases header contact force with the ground. Once the flotation setting is selected, the control valves will return to this preset flotation condition whenever the flotation mode is selected, regardless of subsequent header lift and lower operations.

One aspect of the operator selected flotation setting is that it determines how quickly the header returns in a controlled acceleration or controlled "fall" to its terrain contact position after rising in response to contact with an elevated feature of the terrain. If the header falls too slowly, regions of the field may not be cut at the desired height. If the header falls too rapidly, however, the header may impact or ride roughly over the ground, thereby resulting in undesirably harsh or jarring ride characteristics. It is also possible that the header could impact the ground in some conditions, such as uneven terrain, with sufficient force to result in damage to the header and/or the crop. Typically, an operator's flotation setting will be a function, at least in part, on the ground speed of the vehicle. As a general rule, when traveling over a swath of uneven terrain at a relatively low speed, terrain following can be achieved at slower header accelerations, compared to a higher speed. Thus, for travel at lower speeds, an operator would likely use a flotation setting to allow the header to fall more slowly than that selected for a higher speed.

During the harvesting operation, the header downward acceleration may vary from the desired characteristic selected by the operator due to factors such as increases or decreases in vehicle ground speed, changes in hydraulic fluid viscosity, and other environmental factors. Another such factor of note is change in effective weight of the header. When the vehicle moves through the field, the header often accumulates plant material, rocks, dirt, sand, sticks, and the like, resulting in a gradual increase in the effective weight of the header. As material gradually accumulates on the header, its return rate is gradually increased accordingly. Eventually, the desired flotation characteristic selected by the operator when the header was clear will be negatively impacted requiring calibration of the flotation system to restore the desired header flotation characteristic. Conversely, during a pause in operation, the operator may clear the header of accumulated material resulting in an abrupt decrease in its effective weight and a slower return to its operating height, again requiring flotation system calibration. In this regard, previous systems have sought to compensate for changing conditions, such as weight changes due to accumulated debris on the header, automatically, by using methods that have been found to be undesirably complex and have other disadvantages.

For instance, some known systems require precise height measurement data at a known time interval to compute an acceleration of the header and/or force measurement data at the header to automatically calibrate the flotation system. Requiring header height or force data is disadvantageous because of the sensors required to obtain the data. Typically sensors that supply height, position, or force data require calibration, at least on installation and replacement, thereby increasing the complexity of the system. In addition, a potential source of error is added to the system. For example, if a sensor is improperly calibrated, incorrect input data will likely result in unsatisfactory system operation. It is therefore desirable to implement a flotation calibration system using measuring devices that do not require calibration and are easy to install and replace.

Thus, what is sought is an automatic system and method for calibrating a header flotation system of an agricultural vehicle that can be employed while the vehicle is in motion, including when traversing a field, which does not rely on, or require calibration of, height and/or pressure sensors, and which overcomes at least one of the problems, shortcomings or disadvantages set forth above.

SUMMARY OF THE INVENTION

What is disclosed is a system and method for calibrating a header flotation system of an agricultural vehicle that can be employed while the vehicle is in motion, including when traversing a field, which does not rely on, or require calibration of, height and/or pressure sensors, and which overcomes at least one of the problems, shortcomings or disadvantages set forth above.

A system and method for calibrating a header flotation system for an agricultural vehicle, such as a windrower, that uses sensors that do not need calibration upon installation and thus is less complex than previous systems and methods is presented. According to a preferred embodiment of the invention, flotation cylinders connected between the header and vehicle are controllably operable in a flotation mode for damping controlling vertical acceleration of the header relative to the vehicle. A fluid circuit connects the flotation cylinders and includes a pair of signal controlled valves disposed and configured for regulating fluid pressure between the flotation cylinders and the circuit, i.e. a signal controlled valve associated with each cylinder. When the vehicle is operating in the flotation mode, the fluid circuit regulates the acceleration of the header from an elevated position in the absence of external upward force, such as obstacles on the surface, acting on the header. A motion sensing device, such as a potentiometer, is configured and operable for sensing, in real time, vertical displacement of the header relative to the vehicle and outputting a signal representative thereof. It is important to note that the motion sensing device is not required to measure an actual height or position of the header. Additionally, an input device is operable for selecting an input value representative of the acceleration of the header in absence of external upward force acting thereon and outputting an input signal representative thereof. Typically, the operator selection is based on the "feel" of the header as it returns unsupported by external upward force to its operating height. A controller is in communication with the input device and the motion sensing device and receives signals therefrom. Further the controller is in communication with the signal controlled valves for outputting a control signal thereto.

When in the operator selectable flotation mode, the controller automatically monitors the input signal, responsively determines a value for the control signal for regulating the acceleration of the header corresponding to the input signal, and outputs a signal representative of the determined value of the control signal to the signal controlled valves. Subsequently, the controller monitors the signal from the motion sensing device and determines whether the control signal continues to provide an acceptable acceleration of header.

When the signal from the motion sensing device is indicative of the acceleration of the header exceeding the acceleration corresponding to the input signal, the controller responsively adjusts the control signal to the signal controlled valves to effect a change in the signal from the motion sensing device that is indicative of the acceleration corresponding to the input signal.

Conversely, if the signal from the motion sensing device is indicative of the acceleration of the header being less than the acceleration corresponding to the input signal, the controller determines whether the header is moving downward supported by an obstacle or moving downward regulated by the flotation system. When the signal from the motion sensing device is indicative of the acceleration of the header exceeding a threshold acceleration indicative of the absence of external upward force acting on the header, it is likely that the flotation system is regulating the acceleration of the header, and calibration is desirable. In this situation, the controller stores values representative of the signal from the motion sensing device and analyzes a history of the values for a pattern. If a predetermined number of stored values are within a predetermined tolerance indicative of the absence of external upward force acting on the header, then the controller responsively adjusts the value of the control signal to effect a change in the signal from the motion sensing device that is indicative of the acceleration corresponding to the input signal.

According other aspects of the invention, the controller monitors and/or stores and analyzes the accelerations indicated by signals from a motion sensing device associated with each of first and second end portions of the header. The controller determines and adjusts the control signals to a signal controlled valve associated with each end portion based on the acceleration indicated by the motion sensing device associated with each end portion as compared with the acceleration corresponding to the input device.

According to yet another aspect of the invention, the controller is further operable for ramping the control signal to the signal controlled valves from a first value of zero or near zero to a second value at which upward motion of the header is sensed. Using this information, the controller responsively determines a value for the control signal for regulating the acceleration of the header corresponding to the input signal.

In another embodiment of the invention, the ground speed of the vehicle is monitored and applied to effect header acceleration. The controller adjusts the value for the control signal for regulating the acceleration of the header corresponding to the input signal and ground speed. Subsequently, the controller adjusts the control signal as described above, based on the acceleration indicated by the signal from the motion sensing device as compared to the acceleration representative of the input signal and the ground speed. Generally, according to an aspect of this embodiment, higher ground speeds increase the acceleration, and lower ground speeds decrease the acceleration.

In yet another embodiment of the invention, calibration of the header flotation system is performed starting with the header in an elevated position. The flotation mode is initiated and the header subsequently moves downward in the absence of external upward force acting thereon, regulated by the flotation system. If the signal from the motion sensing device is indicative of the acceleration of the header outside a predetermined tolerance around the acceleration of the header corresponding to the input signal, then the controller responsively adjusts the value for the control signal to effect a change in the signal from the motion sensing device that is indicative of the acceleration corresponding to the input signal.

The system and method described according to the invention are advantageous because preferred apparatus for the motion sensing device may include a sensor, such as a potentiometer or the like, that is simple to install and maintain in that it does not need to be calibrated to provide motion data to controller.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Although the present invention is described in connection with a self-propelled windrower, it will be appreciated that the principles of the present invention are not limited to a self-propelled windrower, or to any specific type of harvesting machine. In addition, the windrower is intended to be representative of a wide variety of windrowing machines, as well as crop harvesting machines and other work machines having a flotation system for a header which is desired or required to be positioned at one or more selectable heights and angles of sideward tilt in relation to the machine itself, as well as to a surface over which the machine is driven, such as the surface of a field or pasture containing crops or grasses to be windrowed, which surface is represented here by line 30 in FIG. 1 and in subsequent figures.

Figure 1:
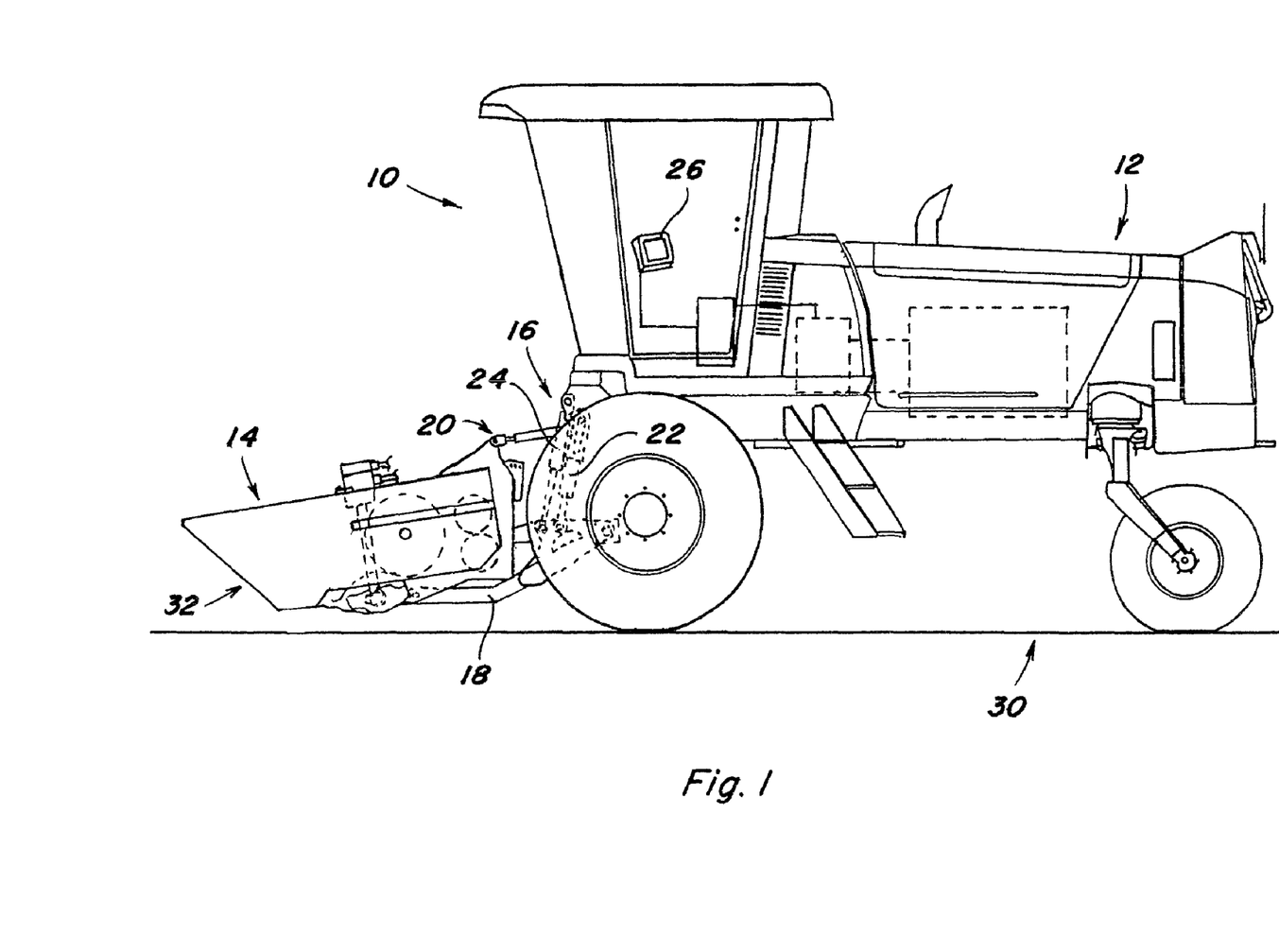
FIG. 1 is a side view of an agricultural vehicle including a header and a header flotation system with which the present invention may be used.

Referring now to the drawings, FIG. 1 shows a self-propelled windrower 10 comprising a tractor 12 and a header 14. Header 14 is of conventional, well known construction, and is an elongate structure extending transversely or sidewardly across the front of windrower 10 and including opposite first and second end portions 32 and 34 (only 32 shown) and may include not only crop-harvesting mechanisms, but also crop conditioners. Header 14 is attached to the front end of a frame 16 or chassis of tractor 12 by a pair of lower arms 18 (only one being shown, the opposite one being generally the same) pivoted at one end to frame 16 and at the other end to header 14, as well as by a central upper link 20. A pair of lift cylinders 22 and a pair of flotation cylinders 24 (only one of each being shown, the opposite one being generally the same) interconnecting lower arm 18 and frame 16 supports each end portion of the header. In other words, each end portion 32, 34 of header 14 is supported by one lift cylinder and one flotation cylinder. Lift cylinders 22 support header 14 at a minimum operating height, often referred to as operating height. When header 14 is elevated from its operating height, in response to a raised portion of the field for example, flotation cylinders 24, controlled by a flotation system in an operator selectable flotation mode, regulate the acceleration of header 14 as it returns to its operating height.

Figure 2:
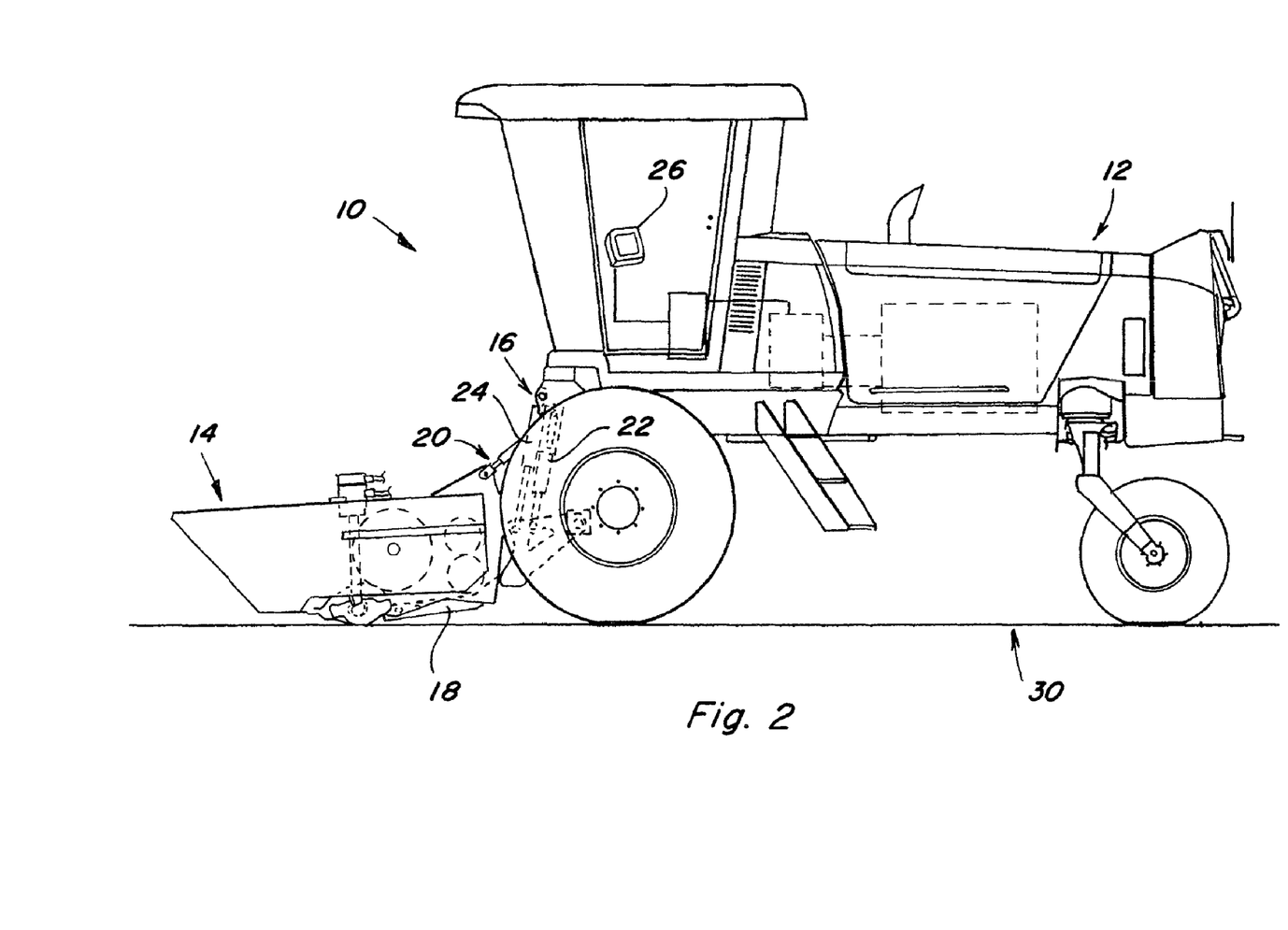
FIG. 2 is a side view of the agricultural vehicle with which the present invention may be used as it traverses level terrain.
Figure 3:
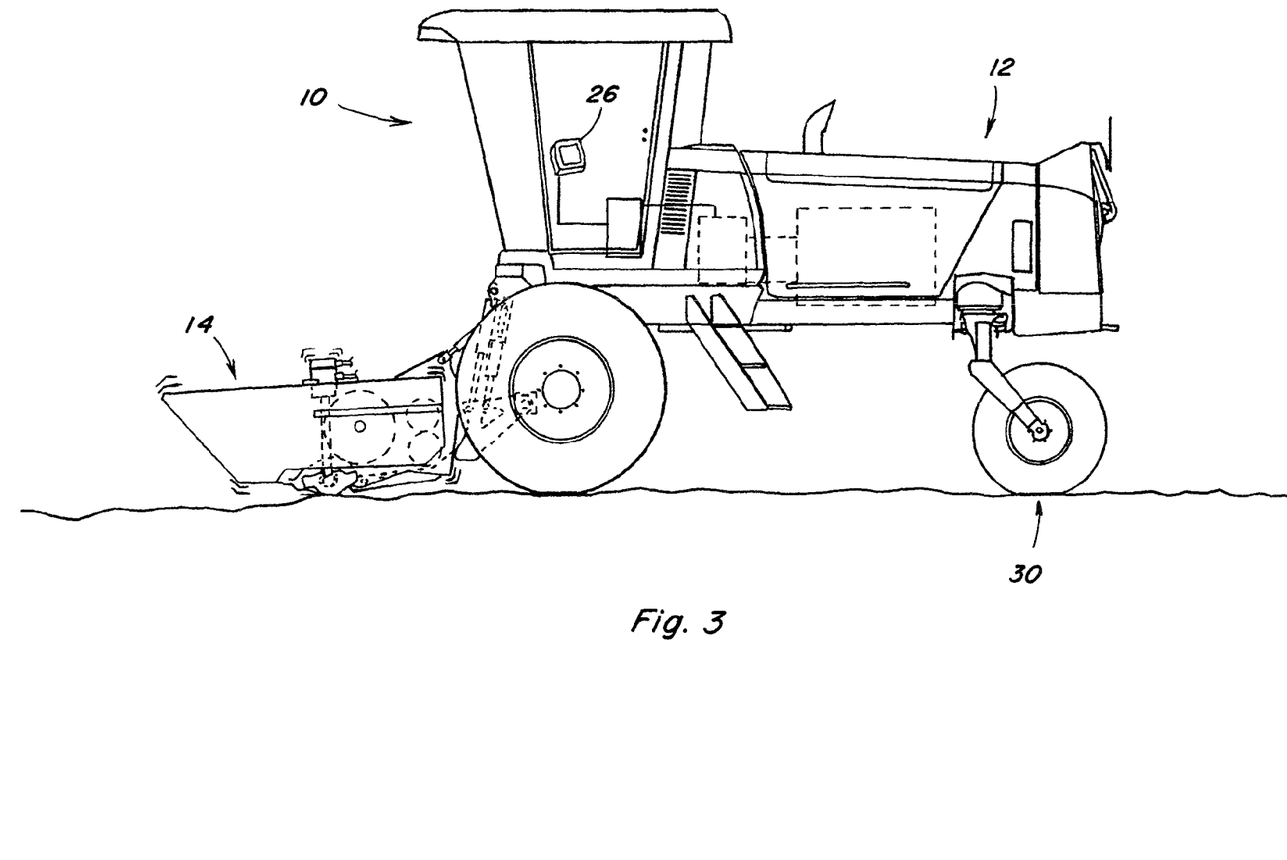
FIG. 3 is a side view of the agricultural vehicle with which the present invention may be used as it traverses uneven terrain.

As illustrated in FIG. 2, when traversing level, even terrain, header 14 remains at its selected operating height maintained, in part, by lift control cylinders 22. In contrast, FIG. 3 shows windrower 10 traveling over uneven terrain wherein the flotation system will be utilized. When header 14 contacts surface 30, it rises along the uneven terrain, and then returns to its operating height at the rate or speed regulated by the flotation system including flotation cylinders 24. The acceleration of header 14 as it returns or falls regulated by the flotation system is important because if header 14 falls too slowly, regions of the field may not be cut at the desired height. Conversely, if header 14 falls too rapidly, it may impact or ride roughly over the ground, thereby resulting in an undesirably harsh or jarring ride or possible damage to header 14.

Figure 4:
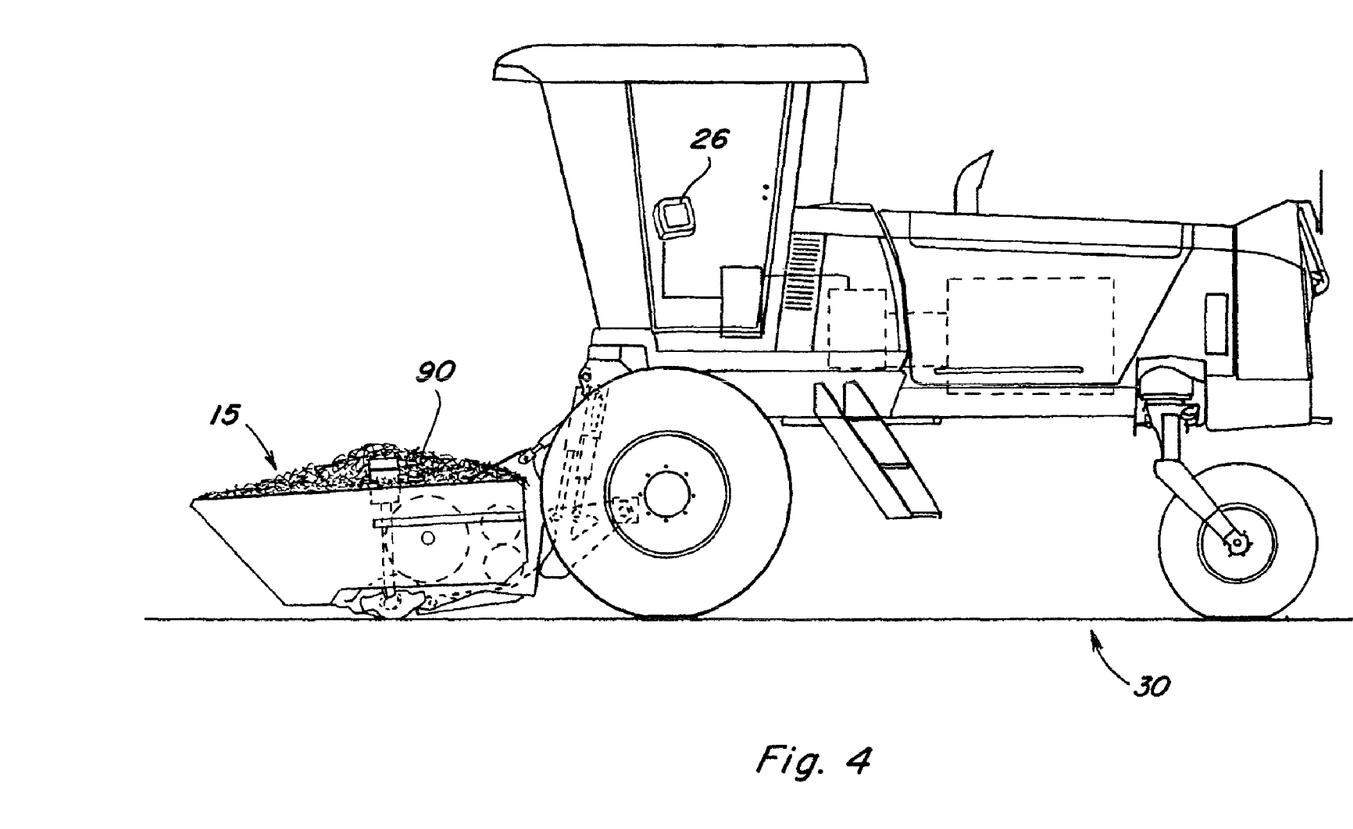
FIG. 4 is a side view of an agricultural vehicle with which the present invention may be used shown with plant material on the header.

As windrower 10 travels across a field, plant material, rocks, dirt, sand, sticks, other debris, and the like (denoted collectively hereinafter as plant material 90), gradually collect on header 14 creating a heavier, loaded header 15, as depicted in FIG. 4. Eventually, as the acceleration of header 14 increases due to the increasing weight, header 14 will begin to fall undesirably rapidly. Conversely, during a pause in operation, the operator may clear header 14 of plant material 90 resulting in an abrupt decrease in its effective weight, and it is possible header 14 will fall undesirably slowly. Both situations require calibration of the flotation system to regain a desirable acceleration of header 14. In this regard, previous systems have sought to calibrate header flotation systems by methods and systems using precise header height and force measurements, and hence, utilize sensors which require calibration, bringing undesirable complexity and other disadvantages to the system.

Figure 5:
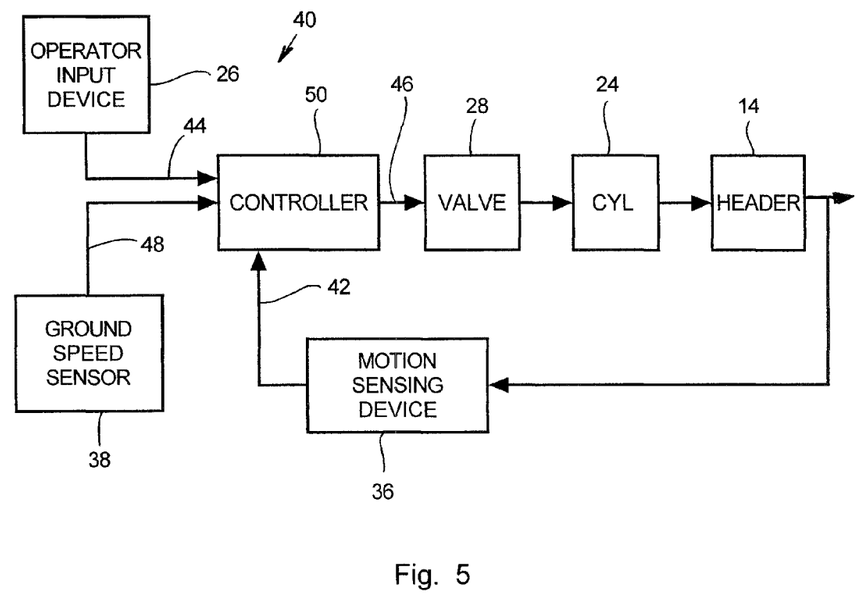
FIG. 5 is a simplified block diagram of the header flotation calibration system according to the present invention.

According to the present invention which is represented in simplified block diagram form in FIG. 5, a system 40 and method for calibrating the header flotation system of an agricultural vehicle or windrower 10 having plant cutting header 14 mounted thereon for vertical displacement relative to windrower 10 is provided. According to a preferred embodiment of the invention, flotation cylinders 24 connected between header 14 and windrower 10 are controllably operable in a flotation mode for controlling vertical acceleration of header 14 relative to windrower 10. A fluid circuit connects flotation cylinders 24 and includes a pair of signal controlled valves 28 disposed and configured for regulating fluid pressure between flotation cylinders 24 and the circuit, i.e. a signal controlled valve associated with each cylinder. When windrower 10 is operating in the flotation mode, the fluid circuit regulates the acceleration of header 14 from an elevated position in the absence of external upward force, such as obstacles on surface 30, acting on header 14. A motion sensing device 36, such as a potentiometer, is configured and operable for sensing, in real time, a vertical acceleration of header 14 relative to windrower 10 and outputting a signal 42 representative thereof. It is important to note that motion sensing device 36 is not required to measure an actual height or position of header 14. Additionally, an input device 26 is operable for selecting an input value representative of the acceleration of header 14 in absence of external upward force acting thereon and outputting an input signal 44 representative thereof. Typically, the operator selection is based on the "feel" of header 14 as it returns unsupported by external upward force to its operating height. A controller 50 is in communication with input device 26 and motion sensing device 36 and receives signals 42 and 44, respectively, therefrom. Controller 50 is also in communication with signal controlled valves 28 for outputting a control signal 46 thereto.

When in the operator selectable flotation mode, controller 50 automatically monitors input signal 44, responsively determines a value for control signal 46 for regulating the acceleration of header 14 corresponding to input signal 44, and outputs a signal representative of the determined value of control signal 46 to signal controlled valves 28. Subsequently, controller 50 monitors signal 42 from motion sensing device 36 and determines whether control signal 46 continues to provide an acceptable acceleration of header 14.

Figure 6:
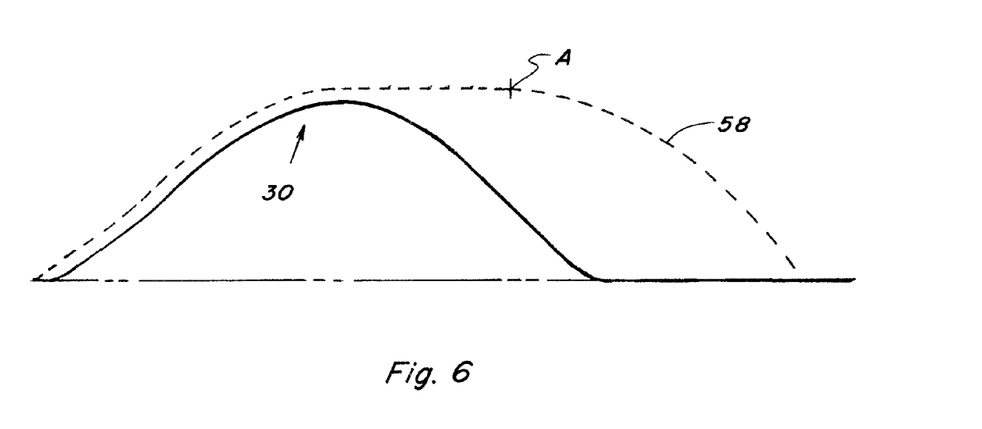
FIG. 6 shows a possible trajectory of the header regulated by the flotation system in response to an obstacle.

FIG. 6 illustrates a trajectory 58 of header 14 when regulated by the flotation system after encountering an obstacle on surface 30. Trajectory 58 is indicative of the acceleration corresponding to input signal 44 when the flotation system is calibrated properly. Trajectory 58 is represented graphically in FIG. 8 with point A of trajectory 58 at the origin, for reference. Associated with trajectory 58 is a velocity 158 of FIG. 9 and an acceleration 258 of FIG. 10. Because trajectory 58 is indicative of the acceleration corresponding to input signal 44 when the flotation system is properly calibrated, velocity 158 and acceleration 258 are also representative of a properly calibrated flotation system.

Figure 8:
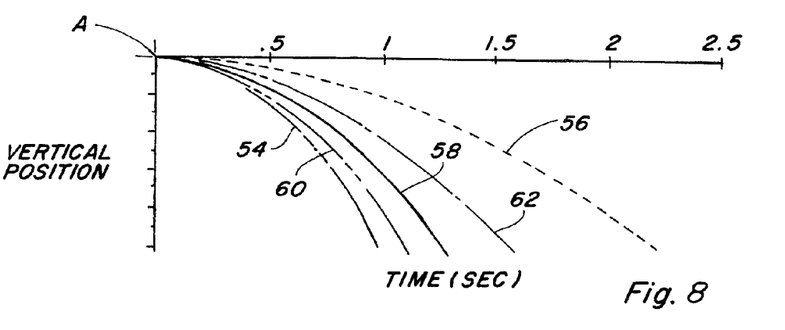
FIG. 8 shows a range of desirable trajectories and possible trajectories of the header regulated by the flotation system in response to the obstacle of FIG. 6.
Figure 9:
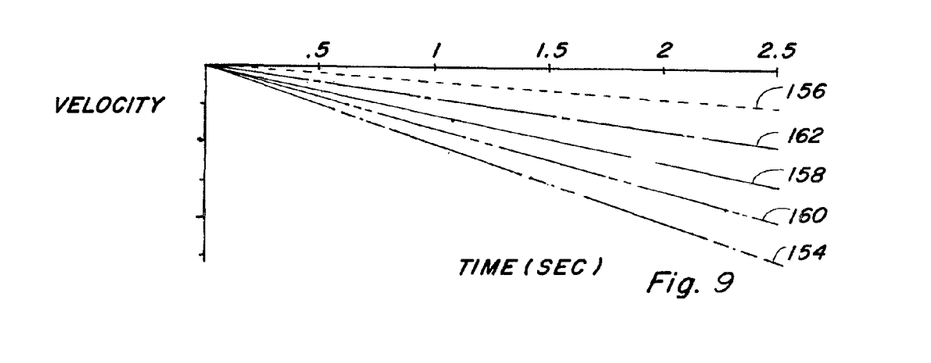
FIG. 9 shows a range of desirable velocities and possible velocities associated with the trajectories of the header shown in FIG. 8.
Figure 10:
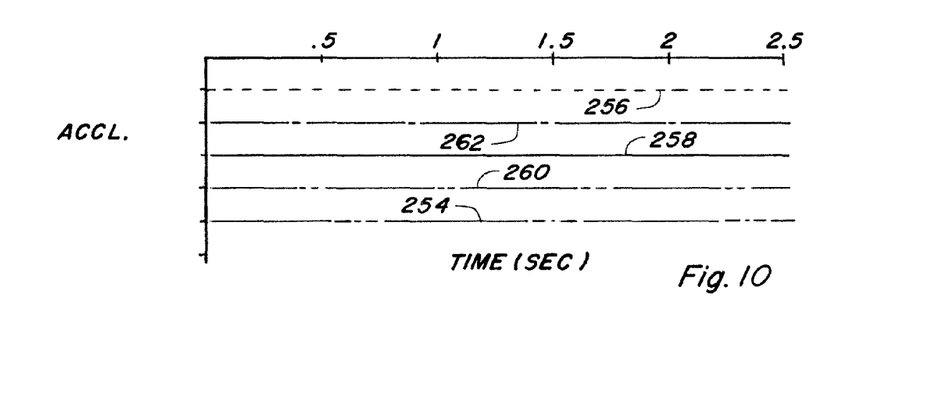
FIG. 10 shows a range of desirable accelerations and possible accelerations associated with the trajectories of the header shown in FIG. 8.

FIGS. 8 through 10 provide graphical representations of possible additional trajectories 54, 56 along with velocities 154, 156 and accelerations 254, 256 associated therewith in response to the obstacle shown in FIG. 6. Trajectory 60, velocity 160, and acceleration 260 represent a predetermined tolerance with respect to trajectory 58, velocity 158, and acceleration 258 in which the header flotation characteristic is acceptable, and the flotation system does not require calibration.

If signal 42 from motion sensing device 36 indicates the flotation characteristic depicted by trajectory 54, velocity 154 and acceleration 254 of FIGS. 8-10, header 14 may have collected plant material 90, increasing its effective weight, and thus increasing the downward acceleration of header 14. Accordingly, trajectory 54 returns header 14 from an elevated position more quickly than trajectory 58 associated with input signal 44 (in a calibrated system), and more quickly than the acceptable tolerance represented by trajectory 60. In addition, downward velocity 154 increases more quickly than velocity 158 associated with input signal 44 and more quickly than the acceptable tolerance represented by velocity 160. Finally, downward acceleration 254 is larger than acceleration 258 associated with input signal 44 and larger than the acceptable tolerance represented by acceleration 260. (Note that downward acceleration in FIG. 10 is represented by a negative number, so a smaller negative number indicates a larger downward acceleration.) Responsive to this situation, controller 50 adjusts the value for control signal 46 to effect a change in signal 42 from motion sensing device 36 that is indicative of the acceleration of header 14 corresponding to input signal 44 (i.e. trajectory 58). Controller 50 outputs a signal representative of the adjusted value for control signal 46 to signal controlled valves 28.

Figure 7:
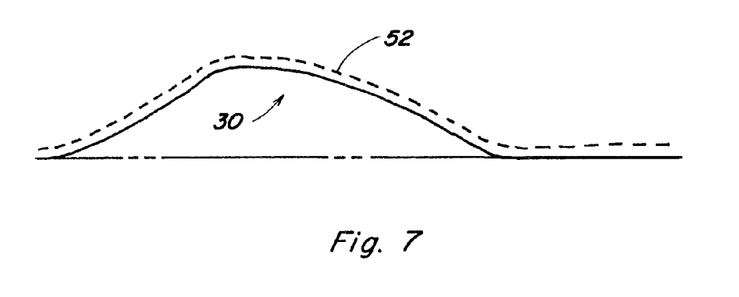
FIG. 7 shows a trajectory of the header when supported by another obstacle

Conversely, if signal 42 from motion sensing device 36 is indicative of the acceleration of header 14 being less than the acceleration of header 14 corresponding to input signal 44, more than one situation is possible. One possibility is that header 14 is moving downward supported by an obstacle on surface 30 as shown by possible trajectory 52 of FIG. 7. Since the flotation system is not regulating the acceleration of header 14 in this situation, calibration of the flotation system is undesirable and could introduce error into the system.

As an alternative, if signal 42 from motion sensing device 36 is indicates the flotation characteristic depicted by trajectory 56, velocity 156, and acceleration 256 of FIGS. 8-10, header 14 may have shed some previously accumulated plant material 90, decreasing its effective weight and thus decreasing the downward acceleration of header 14. To ascertain the difference between trajectory 52 of FIG. 7 and trajectory 56 of FIG. 8, controller 50 compares the accelerations of the trajectories to a predetermined threshold acceleration, represented by acceleration 62, that is indicative of the absence of external upward force acting on the header, i.e., header 14 is unsupported by the ground. In this situation, the flotation system is likely regulating the acceleration of header 14, and calibration is desirable. However, it is also possible that a relatively steep obstacle may still be supporting header 14.

To distinguish the flotation characteristic indicating header 14 requires calibration, from the situation in which header 14 rides along supported by a relatively steep slope, controller 50 stores values representative of signal 42 from motion sensing device 36 and analyzes a history of the values for a pattern. If a predetermined number of stored values are within a predetermined tolerance indicative of the absence of external upward force acting on header 14 or, in other words, within a predetermined tolerance of the flotation characteristic depicted by trajectory 60, velocity 160 and acceleration 260, controller 50 compares the acceleration of header 14 to the acceleration of header 14 corresponding to input signal 44. In this situation, the stored data representative of trajectory 56, velocity 156 and acceleration 256 is compared to trajectory 58, velocity 158 and acceleration 258. As can be seen in the figures, trajectory 56 returns header 14 from an elevated position more slowly than trajectory 58 associated with input signal 44 (in a calibrated system). In addition, downward velocity 156 increases more slowly than velocity 158 associated with input signal 44. Finally, downward acceleration 256 is smaller than acceleration 258 associated with input signal 44. (Note that downward acceleration in FIG. 10 is represented by a negative number, so a larger negative number indicates a smaller downward acceleration). Responsive to this situation, controller 50 adjusts the value for control signal 46 to effect a change in signal 42 from motion sensing device 36 that is indicative of the acceleration of header 14 corresponding to input signal 44 (i.e. trajectory 58). Controller 50 outputs a signal representative of the adjusted value for control signal 46 to signal controlled valves 28.

It is possible that header 14 will accumulate plant material 90 unevenly between opposite end portions 32 and 34 of header 14 to such a degree that one end portion returns to its operating height more quickly then the other end portion creating the feel of an unbalanced header. Accordingly, another aspect of the invention allows controller 50 to monitor and/or store and analyze the acceleration indicated by first and second motion sensing devices associated with each of first and second end portions 32 and 34, respectively. Controller 50 determines and adjusts first and second control signals for first and second signal controlled valves associated with each end portion of the header, respectively, based on the acceleration indicated by the first and second motion sensing devices as compared to the acceleration corresponding to input signal 44.

According to yet another aspect of the invention, controller 50 is further operable for ramping control signal 46 to signal controlled valves 28 from a first value of zero or near zero to a second value at which upward motion of header 14 is sensed. Just prior to its upward motion, header 14 is at an equilibrium point wherein the upward force produced by flotation cylinders 24 balances the downward force due to the weight of header 14. Using the second value of control signal 46, controller 50 responsively determines a value for control signal 46 for regulating the acceleration of header 14 corresponding to input signal 44, and outputs a signal representative of the determined value of control signal 46 to signal controlled valves 28.

In another embodiment of the invention, header acceleration is adjusted based on vehicle ground speed, which, as an example, may be provided by a ground speed sensor 38 disposed and operable for sensing a ground speed of windrower 10 and outputting a signal 48 representative thereof to controller 50 in a well known manner as shown in FIG. 5. Controller 50 adjusts the value for control signal 46 for regulating the acceleration of header 14 corresponding to both signals 44 and 48 from input device 26 and sensor 38, respectively, and outputs a signal representative of the adjusted value of control signal 46 to signal controlled valves 28. Subsequently, controller 50 adjusts control signal 46 as described above, based on the acceleration indicated by signal 42 from motion sensing device 36 as compared to the acceleration representative of signals 44 and 48 from input device 26 and sensor 38, respectively, and outputs a signal representative of the adjusted value of control signal 46 to signal controlled valves 28.

According to another aspect of the invention, when signal 48 is indicative of lower ground speeds, the acceleration of header 14 corresponding to signals 44 and 48 from input device 26 and sensor 38, respectively, is less than the acceleration of header 14 corresponding to signal 44 from input device 26. Conversely, when signal 48 is indicative of higher ground speeds, the acceleration of header 14 corresponding to signals 44 and 48 from input device 26 and sensor 38, respectively, is greater than the acceleration of header 14 corresponding to signal 44 from input device 26.

In yet another embodiment of the invention, calibration of the header flotation system is performed starting with header 14 in an elevated position. The flotation mode is initiated and header 14 subsequently moves downward in the absence of external upward force acting thereon and regulated by the flotation system. If signal 42 from motion sensing device 36 is indicative of the acceleration of header 14 outside a predetermined tolerance around the acceleration of header 14 corresponding to input signal 44, then controller 50 responsively adjusts the value for control signal 46 to effect a change in signal 42 from motion sensing device 36 that is indicative of the acceleration of header 14 corresponding to input signal 44. Controller 50 outputs a signal representative of the adjusted value for control signal 46 to signal controlled valves 28.

The system and method described according to the invention are advantageous because preferred apparatus for motion sensing device 36 may include a sensor, such as a potentiometer or the like, that is simple to install and maintain in that it does not need to be calibrated to provide motion data to controller 50.

Figure 11:
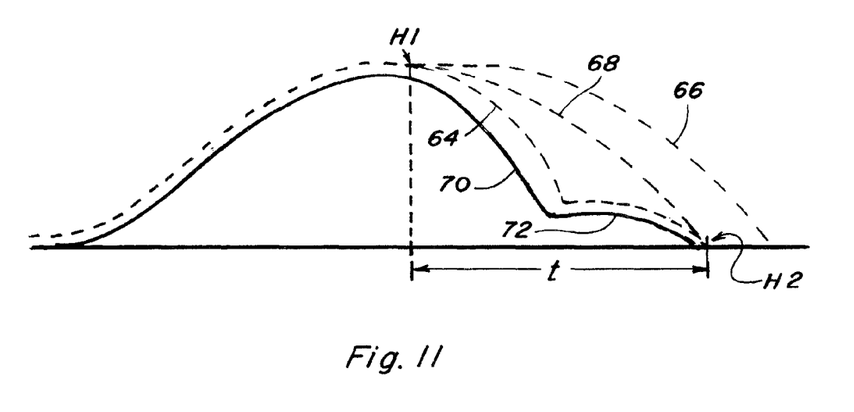
FIG. 11 shows possible trajectories of the header of the agricultural vehicle when traversing yet her obstacle.

Another disadvantage of previous systems and methods can be illustrated with reference to FIG. 11 which depicts a possible trajectory 64 after encountering an obstacle having a first portion 70 and a lower second portion 72. The acceleration corresponding to input signal 44 for a properly calibrated system is represented by trajectory 66. As seen in FIG. 11 the acceleration represented by trajectory 64 associated with first portion 70 of the obstacle exceeds the acceleration represented by dotted line 66, likely indicating that calibration of the flotation system is desirable. The portion of trajectory 64 associated with second portion 72 rides along the obstacle unregulated by the flotation system, and calibration based on the flotation characteristic information from this portion of the trajectory may introduce errors into the system. Previous systems and methods that measure height and/or position data take a measurement at the highest position of the header, denoted H1, and measure the time, denoted t, required for the header to return to its operating height, denoted H2. Using a change in height over time, these systems make calculations for determining flotation system calibration. Trajectories 64 and 68 have the same highest position H1 and return to operating height H2 in time t. Trajectory 68 represents an acceptable flotation characteristic based on trajectory 66, however, as noted above, the first portion of trajectory 64, the portion regulated by the flotation system, indicates calibration is desirable. In this example, it seems unlikely that previous systems would differentiate trajectory 64 from trajectory 68, and the header flotation system would not be calibrated.

Applying this example to the present invention, as header 14 traverses first portion 70 of the obstacle along trajectory 64, signal 42 from motion sensing device 36 is indicative of a vertical acceleration exceeding the acceleration corresponding to input signal 44 (represented by trajectory 66). As a result, controller 50 responsively adjusts the value for control signal 46 to effect a change in signal 42 from motion sensing device 36 that is indicative of the acceleration of header 14 corresponding to input signal 44 and outputs a signal representative of the adjusted value for control signal 46 to signal controlled valves 28 to calibrate the flotation system. When header 14 traverses second portion 72 of the obstacle along trajectory 64, controller 50 determines, based on signal 42 from motion sensing device 36, that header 14 is supported by an upward force, second portion 72, in this case, and the flotation system is not regulating the acceleration.

In light of all the foregoing, it should thus be apparent to those skilled in the art that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for calibrating a header flotation system of an agricultural vehicle, comprising:

a self propelled agricultural vehicle including a plant cutting header mounted thereon for vertical displacement relative to the vehicle;

at least one fluid cylinder connected between the header and the vehicle and controllably operable in an operator selectable flotation mode for controlling vertical acceleration of the header relative to the vehicle;

a fluid circuit in connection with the cylinder including at least one signal controlled valve disposed and configured for regulating fluid pressure between the cylinder and the circuit, including in the flotation mode to regulate a vertical acceleration of the header from an elevated position in absence of external upward force acting on the header;

at least one motion sensing device configured and operable for sensing, in real time, the vertical acceleration of the header relative to the vehicle and outputting a signal representative thereof;

an input device operable for selecting an input value representative of the acceleration of the header in absence of external upward force acting thereon and outputting an input signal representative thereof; and a controller in communication with the input device and the motion sensing device for receiving the signals therefrom, the controller being in communication with the signal controlled valve for outputting a control signal thereto, and the controller being configured so as to be automatically operable, when in the operator selectable flotation mode, for:

monitoring the input signal, responsively determining a value for the control signal for regulating the acceleration of the header corresponding to the input signal, and outputting a signal representative of the determined value of the control signal to the signal controlled valve; and subsequently monitoring the signal from the motion sensing device; and
- if the signal from the motion sensing device is indicative of the acceleration of the header exceeding the acceleration of the header corresponding to the input signal by a predetermined tolerance, then responsively adjusting the value for the control signal to effect a change in the signal from the motion sensing device that is indicative of the acceleration of the header corresponding to the input signal, and outputting a signal representative of the adjusted value for the control signal to the signal controlled valve;
- if the signal from the motion sensing device is indicative of the acceleration of the header being less than the acceleration of the header corresponding to the input signal and exceeding a threshold acceleration indicative of absence of external upward force acting on the header, then store values representative of the signal from the motion sensing device; and
  - if a predetermined number of stored values are within a predetermined tolerance indicative of absence of external upward force acting on the header and the acceleration of the header being less than the acceleration of the header corresponding to the input signal, then responsively adjusting the value of the control signal to effect a change in the signal from the motion sensing device that is indicative of the acceleration of the header corresponding to the input signal, and outputting a signal representative of the adjusted value for the control signal to the signal controlled valve.

2. The system of claim 1, including:

first and second fluid cylinders disposed in supporting relation to opposite first and second end portions of the header, respectively;

first and second fluid circuits including first and second signal controlled valves disposed and configured for regulating fluid pressure between the first and second cylinders and the first and second circuits, respectively, including in the flotation mode to regulate first and second accelerations in absence of application of an external upward force of the first and second end portions of the header from first and second elevated positions, respectively;

first and second motion sensing devices configured and operable for sensing, in real time, first and second vertical accelerations of the first and second end portions of the header, respectively, and outputting first and second signals, respectively, representative thereof; and the controller being in communication with the first and second signal controlled valves for outputting first and second control signals thereto, respectively, and the controller being configured so as to be automatically operable, when in the operator selectable flotation mode, for:

monitoring the input signal, responsively determining first and second values for the first and second control signals, respectively, for regulating the first and second accelerations of the first and second end portions of the header, respectively, corresponding to the input signal, and outputting first and second signals representative of the first and second determined values of the control signal to the first and second signal controlled valves, respectively; and subsequently monitoring the first and second signals from the first and second motion sensing devices, respectively; and
- if the signal from the first motion sensing device is indicative of the acceleration of the first end portion of the header exceeding the acceleration of the header corresponding to the input signal by a predetermined tolerance, then responsively adjusting the first value for the first control signal to effect a change in the first signal from the first motion sensing device that is indicative of the acceleration of the first end portion of the header corresponding to the input signal, and outputting a first signal representative of the first adjusted value for the first control signal to the first signal controlled valve;
- if the first signal from the first motion sensing device is indicative of the acceleration of the first end portion of the header being less than the acceleration of the header corresponding to the input signal and exceeding a threshold acceleration indicative of absence of external upward force acting on the header, then store values representative of the first signal from the first motion sensing device; and
  - if a predetermined number of stored values are within a predetermined tolerance indicative of absence of external upward force acting on the header and the acceleration of the first end portion of the header being less than the acceleration of the header corresponding to the input signal, then responsively adjusting the first value of the control signal to effect a change in the first signal from the first motion sensing device that is indicative of the acceleration of the first end portion of the header corresponding to the input signal, and outputting a first signal representative of the first adjusted value for the first control signal to the first signal controlled valve; and
- if the signal from the second motion sensing device is indicative of the acceleration of the second end portion of the header exceeding the acceleration of the header corresponding to the input signal by a predetermined tolerance, then responsively adjusting the second value for the second control signal to effect a change in the second signal from the second motion sensing device that is indicative of the acceleration of the second end portion of the header corresponding to the input signal, and outputting a second signal representative of the second adjusted value for the second control signal to the second signal controlled valve;
- if the second signal from the second motion sensing device is indicative of the acceleration of the second end portion of the header being less than the acceleration of the header corresponding to the input signal and exceeding a threshold acceleration indicative of absence of external upward force acting on the header, then store values representative of the second signal from the second motion sensing device; and
  - if a predetermined number of stored values are within a predetermined tolerance indicative of absence of external upward force acting on the header and the acceleration of the second end portion of the header being less than the acceleration of the header corresponding to the input signal, then responsively adjusting the second value of the control signal to effect a change in the second signal from the second motion sensing device that is indicative of the acceleration of the second end portion of the header corresponding to the input signal, and outputting a second signal representative of the second adjusted value for the second control signal to the second signal controlled valve.

3. The system of claim 1, wherein the motion sensing device is a potentiometer.

4. The system of claim 1, wherein the motion sensing device senses the acceleration of the header.

5. The system of claim 1, wherein the controller is further configured so as to be operable for:
ramping the control signal to the signal controlled valve from a first value of zero or near zero to a second value at which upward motion of the header is sensed; and
responsively determining a value for the control signal for regulating the acceleration of the header corresponding to the input signal, and outputting a signal representative of the determined value of the control signal to the signal controlled valve.

6. A system for calibrating a header flotation system of an agricultural vehicle, comprising:
a self propelled agricultural vehicle including a plant cutting header mounted thereon for vertical displacement relative to the vehicle;
at least one fluid cylinder connected between the header and the vehicle and controllably operable in an operator selectable flotation mode for controlling vertical acceleration of the header relative to the vehicle;
a fluid circuit in connection with the cylinder including at least one signal controlled valve disposed and configured for regulating fluid pressure between the cylinder and the circuit, including in the flotation mode to regulate a vertical acceleration of the header from an elevated position in absence of external upward force acting on the header;
at least one motion sensing device configured and operable for sensing, in real time, the vertical acceleration of the header relative to the vehicle and outputting a signal representative thereof;
an apparatus operable for providing a ground speed of the vehicle and outputting a signal representative thereof;
an input device operable for selecting an input value representative of the acceleration of the header in absence of external upward force acting thereon and outputting an input signal representative thereof; and
a controller in communication with the input device, the apparatus operable for providing a ground speed, and the motion sensing device for receiving the signals therefrom, the controller being in communication with the signal controlled valve for outputting a control signal thereto, and the controller being configured so as to be automatically operable, when in the operator selectable flotation mode, for:
monitoring the input signal, responsively determining a value for the control signal for regulating the acceleration of the header corresponding to the input signal, and outputting a signal representative of the determined value of the control signal to the signal controlled valve; and subsequently
monitoring the signal representative of ground speed; and
if the signal representative of ground speed is indicative of ground speed outside a predetermined range of ground speeds, then adjusting the value for the control signal for regulating the acceleration of the header corresponding to the signals from the input device and the apparatus, and outputting a signal representative of the adjusted value of the control signal to the signal valve;
monitoring the signal from the motion sensing device; and
if the signal from the motion sensing device is indicative of the acceleration of the header exceeding the acceleration of the header corresponding to the signals from the input device and the sensor by a predetermined tolerance, then responsively adjusting the value for the control signal to effect a change in the signal from the motion sensing device that is indicative of the acceleration of the header corresponding to the signals from the input device and the apparatus, and outputting a signal representative of the adjusted value for the control signal to the signal controlled valve;
if the signal from the motion sensing device is indicative of the acceleration of the header being less than the acceleration of the header corresponding to the signals from the input device and the apparatus and exceeding a threshold acceleration indicative of absence of external upward force acting on the header, then store values representative of the signal from the motion sensing device; and
if a predetermined number of stored values are within a predetermined tolerance indicative of absence of external upward force acting on the header and the acceleration of the header being less than the acceleration of the header corresponding to the signals from the input device and the apparatus, then responsively adjusting the value of the control signal to effect a change in the signal from the motion sensing device that is indicative of the acceleration of the header corresponding to the signals from the input device and the apparatus, and outputting a signal representative of the adjusted value for the control signal to the signal controlled valve.

7. The system of claim 6, wherein for ground speeds below a predetermined value, the acceleration of the header corresponding to the signals from the input device and the apparatus is less than the acceleration of the header corresponding to the input signal alone.

8. The system of claim 6, wherein for ground speeds above a predetermined value, the acceleration of the header corresponding to the signals from the input device and the apparatus is greater than the acceleration of the header corresponding to the input signal alone.

9. The system of claim 1, wherein the controller is further operable, upon initiation of the flotation mode with the header at a manually elevated position and the header subsequently moving downward in absence of external upward force acting thereon, for:
monitoring the signal from the motion sensing device; and
if the signal from the motion sensing device is indicative of the acceleration of the header outside a predetermined tolerance around the acceleration of the header corresponding to the input signal, then responsively adjusting the value for the control signal to effect a change in the signal from the motion sensing device that is indicative of the acceleration of the header corresponding to the input signal, and outputting a signal representative of the adjusted value for the control signal to the signal controlled valve.

10. A method for automatically calibrating a header flotation system of an agricultural vehicle, comprising the steps of:
providing a fluid cylinder interconnecting a header and a frame of the agricultural vehicle and controllably operable in an operator selectable flotation mode for controlling vertical acceleration of the header relative to the vehicle;

providing a fluid circuit in connection with the cylinder including a signal controlled valve disposed and configured for regulating fluid pressure between the cylinder and the circuit, including, in the flotation mode, to regulate a vertical acceleration of the header from an elevated position in absence of external upward force acting on the header;

providing a motion sensing device configured and operable for sensing, in real time, the vertical acceleration of the header relative to the vehicle and outputting a signal representative thereof;

providing an input device operable for selecting an input value representative of the acceleration of the header in absence of external upward force acting thereon and outputting an input signal representative thereof;

providing a controller in communication with the input device and the motion sensing device for receiving signals therefrom, the controller being in communication with the signal controlled valve for outputting a control signal thereto, and the controller being configured so as to be automatically operable, when in the operator selectable flotation mode, for:

monitoring the input signal, responsively determining a value for the control signal for regulating the acceleration of the header corresponding to the input signal, and outputting a signal representative of the determined value of the control signal to the signal controlled valve; and subsequently monitoring the signal from the motion sensing device; and
    if the signal from the motion sensing device is indicative of the acceleration of the header exceeding the acceleration of the header corresponding to the input signal by a predetermined tolerance, then responsively adjusting the value for the control signal to effect a change in the signal from the motion sensing device that is indicative of the acceleration of the header corresponding to the input signal, and outputting a signal representative of the adjusted value for the control signal to the signal controlled valve;
    if the signal from the motion sensing device is indicative of the acceleration of the header being less than the acceleration of the header corresponding to the input signal and exceeding a threshold acceleration indicative of absence of external upward force acting on the header, then store values representative of the signal from the motion sensing device; and
    if a predetermined number of stored values are within a predetermined tolerance indicative of absence of external upward force acting on the header and the acceleration of the header being less than the acceleration of the header corresponding to the input signal, then responsively adjusting the value of the control signal to effect a change in the signal from the motion sensing device that is indicative of the acceleration of the header corresponding to the input signal, and outputting a signal representative of the adjusted value for the control signal to the signal controlled valve.

11. The method of claim 10, wherein the motion sensing device is a potentiometer.

12. The method of claim 10, wherein the motion sensing device senses the acceleration of the header.

13. The method of claim 10, wherein the controller is further operable for:
ramping the control signal to the signal controlled valve from a first value of zero or near zero to a second value at which upward motion of the header is sensed; and
responsively determining a value for the control signal for regulating the acceleration of the header corresponding to the input signal, and outputting a signal representative of the determined value of the control signal to the signal controlled valve.

14. The method of claim 10, comprising the further steps of:
manually lifting the header to an elevated position;
initiating the flotation mode;
allowing the header to move downward in absence of external upward force acting thereon;
monitoring the signal from the motion sensing device; and
    if the signal from the motion sensing device is indicative of the acceleration of the header outside a predetermined tolerance around the acceleration of the header corresponding to the input signal, then responsively adjusting the value for the control signal to effect a change in the signal from the motion sensing device that is indicative of the acceleration of the header corresponding to the input signal, and outputting a signal representative of the adjusted value for the control signal to the signal controlled valve.

* * * * *